UNITED STATES PATENT OFFICE.

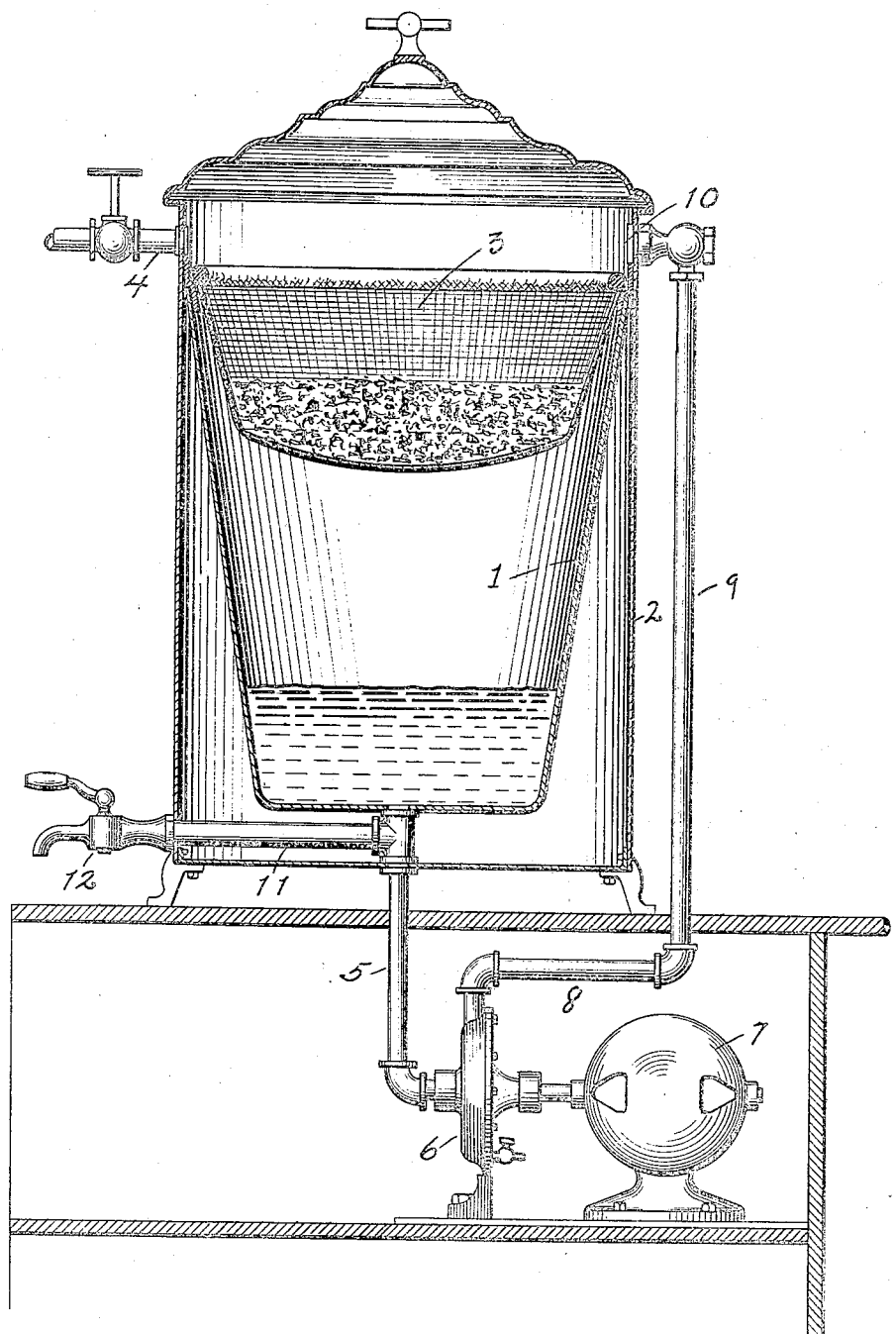

FREDERIC A. CAUCHOIS, OF NEW YORK, N. Y.

APPARATUS FOR PREPARING INFUSIONS.

941,009.

Specification of Letters Patent. Patented Nov. 23, 1909.

Application filed March 19, 1908. Serial No. 422,000.

*To all whom it may concern:*

Be it known that I, FREDERIC A. CAUCHOIS, a citizen of the United States of America, residing in the city, county, and State of New York, have invented certain new and useful Improvements in Apparatus for Preparing Infusions, of which the following is a specification.

This invention relates to certain new and useful improvements in apparatus for preparing infusions, particularly to coffee urns and the like; the principal object being to secure a general increase of efficiency over that obtainable in the devices heretofore used for the purpose.

While the improvements are primarily intended for use in the preparation of the infusion of coffee, and the drawing and description particularly show an apparatus for that purpose, it will be seen that such is only one of many uses of which the improved apparatus is capable.

The figure is a general view of a coffee urn and connected parts showing the invention.

In the ordinary method of preparing an infusion of coffee on a large scale, it is usual to pour boiling water through the ground coffee contained in a porous or perforated receptacle, the infusion being received in the urn, in the upper part of which such receptacle is generally situated. In order to make the infusion sufficiently strong, it is the practice to withdraw it from the urn and repour it through the ground coffee as often as may be necessary. In order to facilitate this process in the present invention, I provide a centrifugal pump located preferably beneath the urn and adapted to withdraw the liquid therefrom and discharge it again upon the ground coffee or other material in the porous or perforated container. As my invention is particularly adapted for the preparation of infusions on a comparatively large scale, I preferably drive the centrifugal pump, which, of course, operates at a relatively high speed, by a small electric motor.

In the drawing, which shows the coffee urn of the class generally used in hotels, restaurants and the like, the principal parts are illustrated in section.

1 is an urn or container for the infusion, shown surrounded by the usual jacket 2; 3 is the receptacle for the ground coffee, usually a bag of textile material provided with a metallic rim or hoop at its upper end, by means of which it is sustained in the upper portion of the urn; 4 is an inlet pipe for admitting hot water to the receptacle 3.

5 is a pipe leading to a pump 6, operatively connected to a motor 7; the discharge from the pump being through a pipe 8, and a gage glass 9, which forms a continuation of the discharge passage into the receptacle 3.

At 10, I prefer to provide a rose or spray nozzle for the discharge pipe, but this is not absolutely essential; 11 is a branch outlet terminating in a faucet 12 for withdrawing the contents of the urn.

It will be seen that in the operation of the pump, the liquid will be forced up the discharge channel into the receptacle 3, from which it drips or percolates again into the urn.

The apparatus is particularly well adapted for the preparation of coffee on a large scale and is entirely free from the objections which apply to the existing types of coffee urns of which I am aware.

I am informed that heretofore there have existed appliances for preparing coffee in which a re-pouring of the incomplete infusion is effected by means of a suction pump generally located at or near the level of the receptacle for the ground coffee, but in these devices, with the valves necessary for their operation, the preparation of coffee on a large scale has not been satisfactory. Unless interstices of the coffee container are extremely small, in which case the process is inconveniently lengthened, a considerable proportion of the finely ground coffee finds its way into the urn and either clogs the valves or prevents them from properly acting. The presence of these particles of ground coffee in the infusion also renders it impracticable to use a pump with closely fitting parts, since at certain stages in the preparation of coffee, particularly with a very porous coffee container, the liquid will have a large per cent. of solid matter in suspension, which generally embraces a certain proportion of grit or other hard matter. In my apparatus, however, by providing a centrifugal pump which has neither valves nor closely fitting parts and which can work efficiently with an excessive amount of solid matter in suspension in the liquid, I entirely avoid all of the defects of former apparatus for the purpose. By locating the pump beneath the level of the urn, the tendency of the sediment is to flow into the pump and thence be discharged upon the mass of ground coffee. In practice, the effect of the re-pouring of the liquid and the pumping over of the finer particles which pass through the pores or perforations of the coffee container, is to produce an infusion which is practically free from solid matter in suspension. The finer particles become deposited in a layer upon the top of the coffee in the container and in a manner act as a filter bed, so that after a sufficient number of re-pourings have been effected, the resulting infusion is almost entirely free from any solid matter whatever, with the result so much to be desired that the coffee is remarkably clear and not opaque or muddy as with the devices heretofore in use.

Another distinct and important advantage of the present invention lies in the fact that the circulating means are capable of satisfactorily re-pouring liquids at high temperatures. It is found in practice that pumps of the suction type in which the vacuum is relied upon to keep the pump supplied are extremely unsatisfactory with liquids of a temperature near boiling point. As will be readily understood, with the liquid at or near boiling point, (which is the condition in the manufacture of coffee) a suction pump merely draws steam or vapor from the liquid without drawing the liquid itself. It therefore becomes necessary to employ a pump, the feeding of which is entirely independent of suction. By providing beneath the level of the liquid a valveless pump which is entirely independent of suction and supplied by the hydrostatic head of the liquid, I not only obviate the difficulties heretofore encountered with suction pumps, but gain the other advantages hereinbefore set forth. I am aware that various circulating systems have been suggested for apparatus of this class in which suction pumps of different types have been embraced, but, so far as I am aware, in all of these instances the pumps were located in such a position that they would of necessity have been entirely inoperative with the liquid anywhere near the boiling point.

Having described my invention, what I claim is:—

1. A coffee urn having an outlet in the bottom thereof, a connection from said outlet to the upper part of the urn, a centrifugal pump located in said connection below the level of the bottom of the urn, and an offtake for the fluid between the pump and the bottom of the urn.

2. A coffee urn having an outlet in the bottom thereof, a connection from said outlet to the top of the urn, and a centrifugal pump in said connection below the level of the bottom of the urn for lifting the fluid and sediment from the bottom to the top of the urn.

3. A coffee urn having an outlet in the bottom thereof, a connection from said outlet into which the sediment at the bottom of the urn may pass by gravity, said connection leading into the urn again at the upper part thereof, and a valveless pump in said connection below the level of the bottom of the urn for forcing the fluid and sediment through the connection.

Signed by me at city, county and State of New York this 14 day of March, 1908.

FREDERIC A. CAUCHOIS.

Witnesses:
 FRANK B. GREEN,
 J. FREDERICK WOODWORTH.